Jan. 5, 1960

M. LOVE

2,919,749

TIRE GROOVING MACHINE

Filed Oct. 24, 1955

INVENTOR
MILLARD LOVE
BY Ray Eilers ATT'Y.

INVENTOR
MILLARD LOVE

United States Patent Office 2,919,749
Patented Jan. 5, 1960

2,919,749

TIRE GROOVING MACHINE

Millard Love, St. Louis, Mo.

Application October 24, 1955, Serial No. 542,278

5 Claims. (Cl. 157—13)

This invention relates to improvements in tire grooving machines. More particularly, this invention relates to improvements in machines that can form grooves in truck, bus and automobile tires.

It is therefore an object of the present invention to provide an improved machine that can form grooves in truck, bus and automobile tires.

The present invention is a continuation-in-part of the invention for "Tire Grooving Machine" which is disclosed and claimed in my patent application Ser. No. 431,981 which was filed May 24, 1954.

The pneumatic tires of automotive vehicles are usually molded with grooves that facilitate the gripping of the roadway. However, after the pneumatic tires of automotive vehicles have been run for quite a while, the portions of the tire faces that define those grooves will wear away and leave the faces of the tires "bald." Tires with "bald" faces can be quite safe, from the structural point of view, while being quite unsafe from the point of view of skidding on wet or icy streets. Such tires can be rendered resistant to skidding by forming a number of new grooves in their faces; those new grooves providing full gripping of the roadway.

The invention disclosed and claimed in said application relates to a tire grooving machine that can provide a number of skid-resisting grooves in the face of a tire; and it can thereby provide thousands of additional miles of safe driving for the user of that tire. That tire grooving machine is used to form grooves in tires that have been separated from the automotive vehicles; and hence it is particularly helpful and useful where the owner of the tires has extra or spare tires that can be mounted on the trucks, busses or automobiles while the "bald" tires are being grooved. That tire grooving machine is also helpful and useful where the owner of the trucks, busses or automobiles can, without undue inconvenience or loss, take the trucks, busses or automobiles out of service long enough to permit the tires to be taken off of the vehicles, to be grooved, and to be re-mounted on those vehicles.

In many instances, the owners of trucks, busses and automobiles do not have a sufficient supply of extra or spare tires to permit the automotive vehicles to continue in service while the "bald" tires are grooved. In other instances, the owners of the trucks, busses and automobiles find it unduly inconvenient and costly to take the trucks, busses and automobiles out of service long enough to remove the tires, to groove those tires, and them re-mount the tires. In addition, all owners of automotive vehicles find it inconvenient or expensive to dismount and then re-mount the tires prior to and subsequent to the grooving operation. Accordingly, it is very desirable that a tire grooving machine be able to groove tires while those tires are mounted on the automotive vehicles. The present invention provides such a tire grooving machine; that machine being used to form skid-resisting grooves in the faces of tires while the tires are mounted on trucks, busses or automobiles. Not only does such a tire grooving machine minimize the "out of service" time of the trucks, busses and automobiles, and not only does it avoid the labor involved in dismounting and re-mounting the tires, but it obviates increased wear due to inexact re-mounting of the tires and wheels on the automotive vehicles. Hence the tire grooving machine of the present invention affords important savings in time, labor and tires. It is therefore an object of the present invention to provide a tire grooving machine that can groove the tires of trucks, busses and automobiles while those tires are mounted on those vehicles.

Some of the tractors of tractor-trailer trucks have four wheels in very close proximity to each other. Two of those wheels are mounted on one axle, and the other two wheels are mounted on a second axle; and the two axles are mounted in tandem. The problem of grooving one or more of the tires in those sets of four tires is exceedingly difficult because there is so little space between the faces of those tires; and yet the cutters of the tire grooving machine must be positioned and operated between those faces of those tires. The present invention solves this problem and makes it possible to groove one or more of the tires of the sets of four tires by providing a tire grooving machine that has all of the parts thereof mounted closely adjacent the base of that machine and by restricting the overall height and breadth of those parts. It is therefore an object of the present invention to provide a tire grooving machine that has all of the parts thereof mounted closely adjacent the base of that machine and that restricts the overall height and breadth of those parts.

The tire grooving machine provided by the present invention must be rugged because it must carry approximately one quarter of the weight of the automotive vehicle during the tire grooving operation. The problem of making a tire grooving machine that is low enough in height to fit under the "skirts" of some busses and under the fuel tanks of some trucks, while also making that tire grooving machine sufficiently rugged to support approximately one quarter of the weight of a truck or bus is exceedingly difficult. However, the present invention solves this problem by providing a tire grooving machine with a minimum number of parts, by making the weight-supporting parts of that machine heavy and rugged, and by keeping the overall height and breadth of all parts at a minimum.

Because the weight-supporting parts of the tire grooving machine of the present invention must be heavy and rugged, that tire grooving machine will tend to be heavy. Since that tire grooving machine tends to be heavy, it will tend to resist movement; and yet that tire grooving machine must be capable of ready movement so it can be moved into position under the tire to be grooved. Specifically, after the appropriate wheel of a truck, bus or automobile has been elevated by a jack, the tire grooving machine must be moved sideways into position under that wheel. Once the tire grooving machine is in position under that wheel, the wheel is lowered down onto the tire grooving machine. Prior to the time the wheel is fully resting on the tire grooving machine, that machine must be capable of being moved about so it can be set directly under that wheel. Thereafter, that tire grooving machine must be strongly resistant to movement so the grooving operation can be carried out without undesired shifting of the tire grooving machine relative to that wheel.

The requirement that the tire grooving machine be readily movable at one time while being strongly resistant to movement at another time is a difficult one to meet. However, the present invention fulfills that requirement by providing a tire grooving machine that is equipped with resiliently mounted casters that normally hold the base of the tire grooving machine out of engagement with the ground but that yield under the forces applied to the base by the wheel being grooved to permit that base to rest solidly on the ground. It is therefore an object of the present invention to provide a tire grooving machine with a base that can be pressed solidly against the ground by the forces on a wheel being grooved and can thereby resist movement relative to the ground, but that is normally held above the ground by resiliently mounted casters.

The tire grooving machine provided by the present invention should be capable of grooving tires of different diameters. At the same time, that machine must be capable of being moved into position under the "skirts" of busses and under the fuel tanks of trucks. The present invention makes this possible by mounting a tire-receiving roller on short pivot blocks that are selectively connectible to and separable from the base of the tire grooving machine. Those pivot blocks are low enough to be set in position on the base of the tire grooving machine after that base is positioned under the wheel, but before the wheel is lowered onto the tire-engaging roller.

The pivot blocks provided by the present invention must be capable of being set in a number of different positions along the length of that base, and of thereafter resisting forces tending to shift them along the length of that base. Those forces will be heavy; and mere frictional resistance to those forces will not assure the required holding of those pivot blocks. The required holding of those blocks is assured in the present invention by providing pins on the bottoms of the blocks that fit into openings in the base of the tire grooving machine. Those pins also facilitate the insertion of the pivot blocks and rollers after the tire grooving machine is in position under the wheel; those pins being short enough to permit the pivot blocks and roller to be positioned in the limited space above the base of the tire grooving machine. It is therefore an object of the present invention to mount a tire-receiving roller on short pivot blocks that have pins which fit into openings in the base of a tire grooving machine.

The faces of the tires that are to be grooved by the tire grooving machine of the present invention cannot always be freed of oil, water and dust in advance of the grooving operation. The presence of these materials can make the faces of the tires very slippery, and any slippage could seriously affect the tire-grooving operation; because the grooves can be made uniform only if the faces of the tires are moved past the cutters at a uniform rate. The present invention assures uniform movement of the faces of the tires past the cutters of the tire grooving machine by forming a continuous thread on the driving roller of that machine. That thread will force its way into the faces of the tires and apply high pressures to those faces; those pressures being sufficient to avoid slippage between that roller and those faces. The thread is helpful whether or not dirt, water or oil is on the faces of the tires, but it is particularly helpful in preventing slippage when dirt, water or oil are present. The spaces between adjacent turns of the thread provide drains for the water, oil and dust; and the water, oil and dust will not accumulate immediately ahead of, and lubricate, the roller. It is therefore an object of the present invention to provide a tire grooving machine that has a driving roller with a continuous thread on it.

The thread on the tire-receiving roller provided by the present invention is formed so it drives the faces of the tires toward a flange on that tire-receiving roller. Such a driving action on the faces of the tires is important in holding those faces at a predictable and determinable position relative to the cutters of the tire grooving machine. Absent such positioning of the faces of the tires, the groove pattern could become distorted and aberrated.

The tire grooving machine of the present invention has two tire-receiving rollers; and those rollers have the axes thereof inclined to the axes of the wheels which they receive and support. The inclination of the axes of those tire-receiving rollers is such that the engagement between those rollers and the faces of the tires forces those faces toward the flanges on those tire-receiving rollers. Thus, the inclination of the axes of the tire-receiving rollers assists the thread on the driving roller in holding the faces of the tires against the flanges of the rollers. It is therefore an object of the present invention to provide tire-receiving rollers for tire grooving machines that have the axes thereof inclined to the axis of the tire being grooved.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Referring to the drawing in detail, the numeral 30 generally denotes the base plate of one form of tire grooving machine provided by the present invention. That base plate is long and relatively narrow, and it is made of a sturdy piece of steel. The base plate 30 is provided with two elongated troughs 32 along the longer sides thereof.

Figure 2:
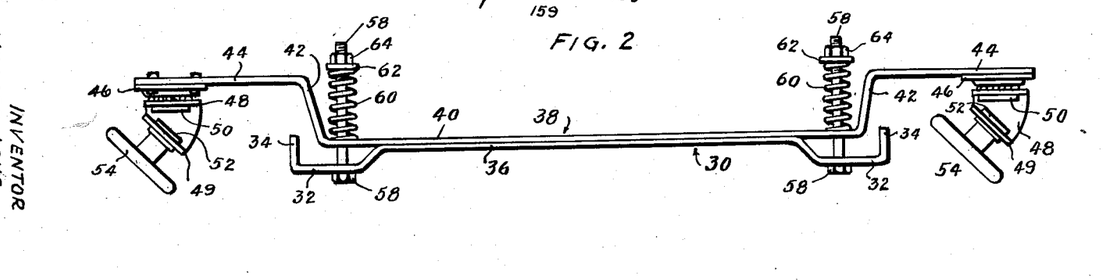
Fig. 2 is an end view of the left hand end of the tire grooving machine of Fig. 1.
Figure 5:
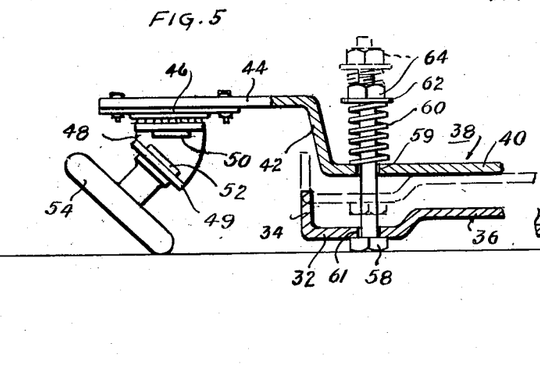
Fig. 5 is a sectional view in elevation of another portion of the tire grooving machine of Fig. 1, and it is taken along the broken plane indicated by the line 5—5 in Fig. 3.
Figure 7:
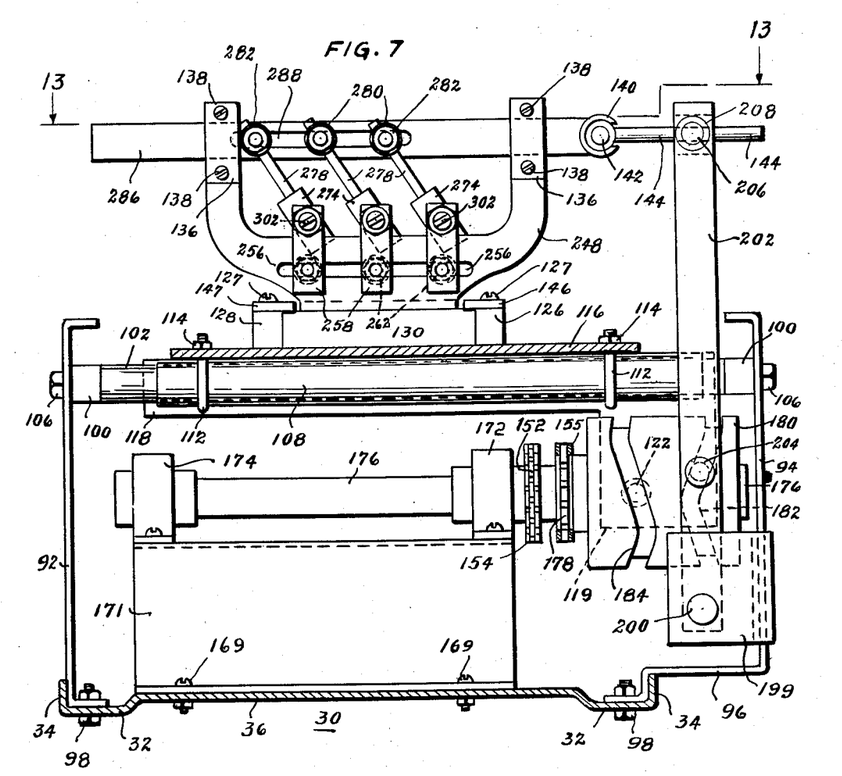
Fig. 7 is a sectional view of still another portion of the tire grooving machine of Fig. 1, and it is taken along the broken plane indicated by the line 7—7 in Fig. 1.

As emphasized particularly in Figs. 2, 5 and 7, the troughs 32 are connected to the central area 36 of the base plate 30 by inclined walls of relatively short height. Those walls constitute the inner bounds of the troughs 32; and vertically directed ribs 34 constitute the outer bounds of those troughs. The ribs 34 and the troughs 32 help stiffen the base plate 30. The central area 36 of the base plate 30 is substantially flat, and it is spaced a short distance above the bottoms of the troughs 32 of that base plate.

Figures 1, 6, 12:
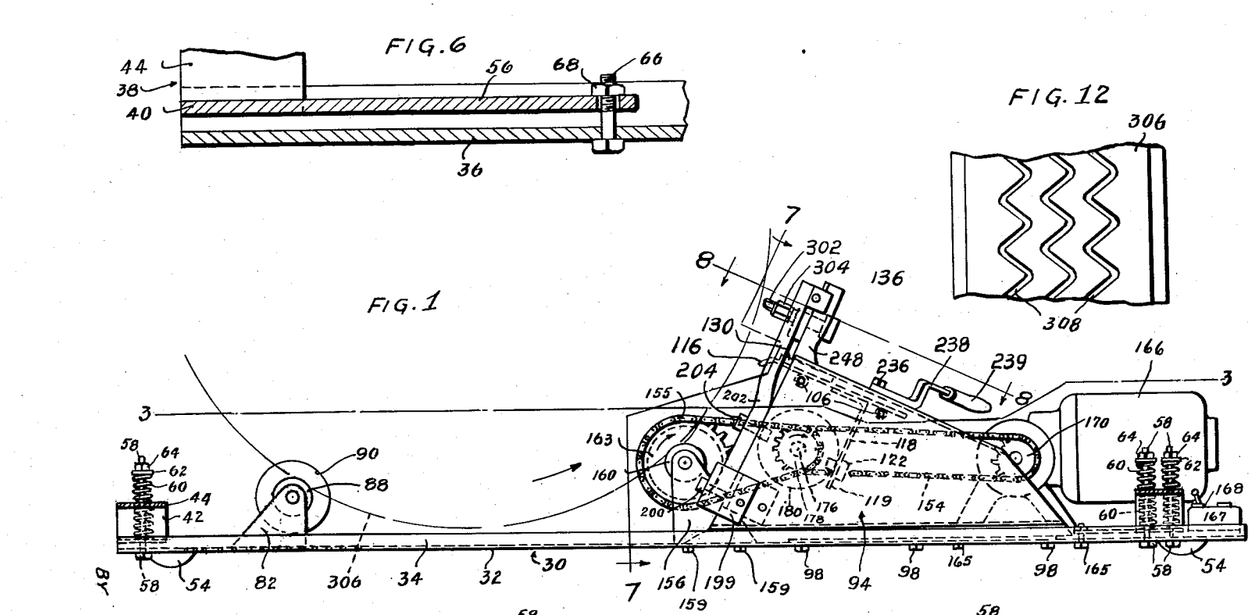
Fig. 1 is a partially sectioned, side elevational view of one form of tire grooving machine that is made in accordance with the principles and teachings of the present invention.
Fig. 6 is a sectional view in elevation of another portion of the tire grooving machine of Fig. 1, and it is taken along the plane indicated by the line 6—6 in Fig. 3.
Fig. 12 is a view of a portion of the face of a tire that has been grooved by the tire grooving machine of the present invention.
Figure 3:
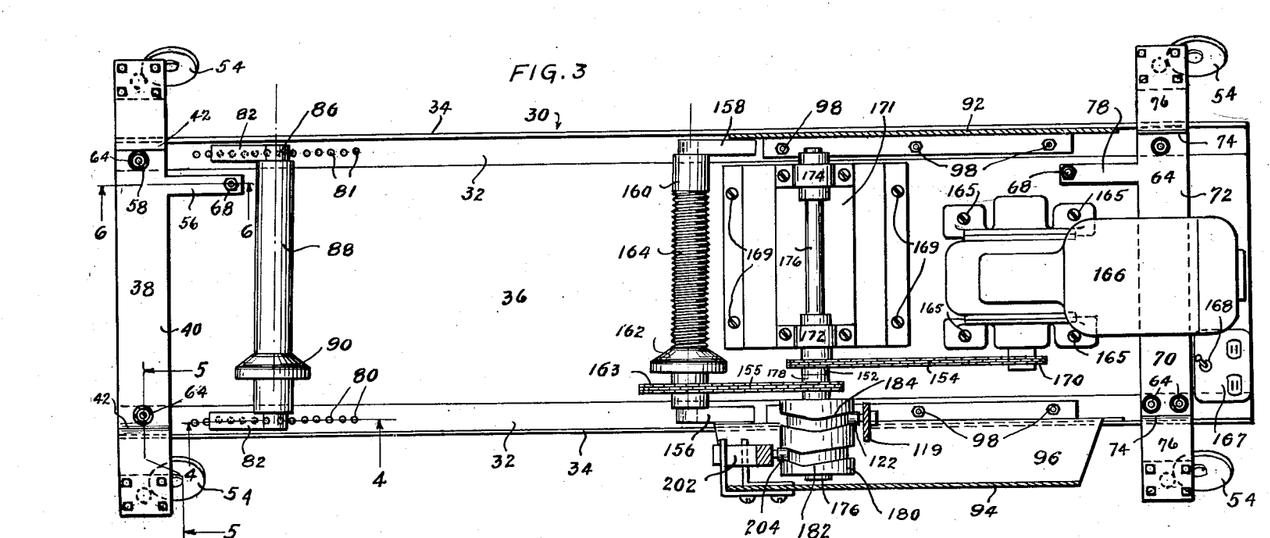
Fig. 3 is a sectional plan view of the tire grooving machine of Fig. 1, and it is taken along the plane indicated by the line 3—3 in Fig. 1.
Figure 4:
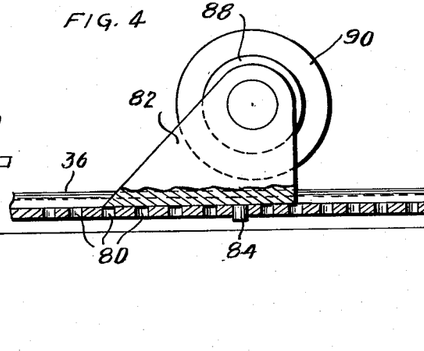
Fig. 4 is a sectional view in elevation of a portion of the tire grooving machine of Fig. 1, and it is taken along the plane indicated by the line 4—4 in Fig. 3.

A caster bracket 38 is provided at the left hand end of the base plate 30, as that base plate is viewed in Figs. 1 and 3. That bracket has a generally flat central span 40 which is long and narrow, and it has two upwardly directed offset portions 42 at the opposite ends of that central span. Two flat horizontal surfaces 44 are contiguous with, and extend outwardly from, the upwardly directed offsets 42; and those flat surfaces are oppositely disposed of the central span 40 of the caster bracket 38. The flat surfaces 44 are in the same plane, and that plane is spaced an appreciable distance above the plane of the central span 40 of the caster bracket 38.

The numeral 46 denotes the top plates of anti-friction bearings which have upper races and lower races. The plates 46 rest upon the upper races of those bearings, and those plates are suitably secured to the under faces of the flat surfaces 44, as by nuts and bolts. Preferably the nuts and bolts are not tightened up, but instead are left slightly loose to permit some "play" between the plates 46 and the flat surfaces 44. The balls in the upper races rest upon offset arms 48 which project outwardly from the axes of the anti-friction bearings and have inclined portions spaced vertically below the portions that support the balls of the upper races. The lower races of the anti-friction bearings are immediately adjacent the under surfaces of the offset plates 48 and are supported by the plates 50. The balls in the two races permit ready and easy rotation of the offset plates 48 relative to the substantially stationary plates 46. Pivots 52 are carried by the inclined and offset portions of the plates 48, and casters 54 are carried by those pivots. The casters 54 are inclined to the vertical and are offset horizontally from the axes of the anti-friction bearings. These casters have relatively large radii without having excessive overall heights. Consequently, those casters are able to roll over small surface deformations, and yet they do not unduly increase the total height of the tire grooving machine. The plates 46, the races, the offset arms 48, the pivots 52 and the casters 54 are commercially available and are not per se part of the present invention.

The caster bracket 38 has an arm 56 that projects outwardly and to the right of the central span 40 of that caster bracket, as that bracket is viewed in Fig. 3. The arm 56 is rigid with the central span 40 of the caster bracket, and it can act to hold that central span in substantial parallelism with the central area 36 of the base plate 30. Specifically, the arm 56 has an opening through which a bolt 66 extends. That bolt also extends through an opening in the central area 36 of the base plate 30, as emphasized particularly in Fig. 6. The spacing between the arm 56 and the central area 36 of the base plate 30 is exaggerated in Fig. 6; but the exaggeration was done for clarity of showing. The head of the bolt 66 will underlie the bottom surface of the central area 36 of the base plate 30, and the nut 68 will overlie the portions of arm 56 which define the opening for bolt 66. The bolt 66 and the nut 68 will maintain the arm 56 and the central area 36 of the base plate 30 in assembled relation. Furthermore, the bolt 66 and the nut 68 will prevent unlimited rotation of the arm 56 about the long axis of caster bracket 38. As a result the arm 56, and the caster bracket 38 of which it is a part, are held in substantial parallelism with the central area 36 of the base plate 30. This parallelism is important since it enables the casters 54 to maintain a certain minimum spacing between the flat surfaces 44 of the caster bracket 38 and the ground; and thus maintains a minimum, but lesser, spacing between the central span 40 and the ground.

The central span 40 of the caster bracket 38 has an opening 59 therethrough at each of the ends thereof. The openings 59 are in register with openings 61 in the troughs 32 of the base plate 30. The openings 59 and 61 receive bolts 58 which have the heads thereof disposed below the bottom surfaces of the troughs 32 and which have the shanks thereof extending upwardly through those openings. Helical springs 60 telescope down over the upper ends of the shanks of the bolts 58; and washers 62 and nuts 64 are telescoped onto the threaded upper ends of the bolts 58. The springs 60 are helical compression springs, and their lower ends will bear against those portions of the central span 40 of the caster bracket 38 which define the openings 59. The upper ends of the helical springs 60 will bear against the washers 62 and provide upward forces on the bolts 58. Those forces are sufficient to raise more than one half of the total weight of the left hand end of the base plate 30; and hence the two springs 60 normally hold the left hand end of the base plate 30 in the position shown by solid lines in Fig. 2 and by dashed lines in Fig. 5. However, those springs can yield; and when a wheel of an automotive vehicle is lowered onto the tire grooving machine the springs 60 will compress and permit the base plate to move downwardly to the position shown by solid lines in Fig. 5. Once the weight of the wheel is removed, however, the base plate will return to the position shown by solid lines in Fig. 2 and by dashed lines in Fig. 5.

The numeral 70 denotes a caster bracket which is generally similar to the caster bracket 38. The caster bracket 70 is located at the right hand end of the base plate 30, while the caster bracket 38 is located at the left end of the base plate, as that base plate is viewed in Figs. 1 and 3. The caster bracket 70 has a central span 72 comparable to the central span 40 of caster bracket 38, it has upwardly directed offset portions 74 comparable to the upwardly directed offset portions 42 of caster bracket 38, and it has flat surfaces 76 which are comparable to the flat surfaces 44 of caster bracket 38. Moreover, caster bracket 70 has an offset arm 78 which is generally comparable to the offset arm 56 of caster bracket 38. Instead of having just two openings 59, as is the case with caster bracket 38, the caster bracket 70 has three openings; and those openings are grouped as shown in Fig. 3. The use of two openings 59 at the lower end of the central span 72 of the caster bracket 70, as that central span is viewed in Fig. 3, is helpful in increasing the resilient forces which that caster bracket can apply to the lower right hand portion of the base plate 30, as that base plate is viewed in Fig. 3. That lower right hand portion of base plate 30 must carry a greater amount of the weight of the tire grooving machine than will the other portions of that base plate because of the offset 96 in the wall 94.

The combined forces of the five helical compression springs 60 will be great enough to hold the central area 36 of the base plate 30 in the position shown by solid lines in Fig. 2 and by the dashed lines in Fig. 5 whenever a wheel is not pressing downwardly on the tire grooving machine. However, whenever a wheel of an automotive vehicle is lowered onto the tire grooving machine, the five springs 60 will yield and permit the central area 36 of base plate 30 to move downwardly to the position shown by solid lines in Fig. 5.

Each of the troughs 32 in the base plate 30 has a number of aligned openings therein adjacent the left hand end thereof, as those troughs are viewed in Fig. 3. The openings in the trough 32 at the bottom of Fig. 3 are denoted by the numeral 80 while the openings in the trough 32 at the top of Fig. 3 are denoted by the numeral 81. The number of openings 80 is exactly equal to the number of openings 81; and the spacing between the openings 80 is the same as the spacing between the openings 81. However, the openings 81 are displaced a short distance to the right of the corresponding openings 80, as those openings are viewed in Fig. 3. Consequently, lines drawn between corresponding openings 80 and 81 will be inclined from lower left to upper right in Fig. 3.

The openings 80 and 81 receive pins 84 which project downwardly from the bottom surfaces of generally triangular pivot blocks 82. These pivot blocks are short in height and they seat in the troughs 32; and hence the tops of those blocks do not extend very far above the tops of the ribs 34. The pivot blocks 82 rotatably support a tire-receiving element 88 in the form of a smooth-faced roller. That roller has a generally frusto-conical flange 90 thereon. The pins 84 in the pivot blocks 82 are spaced the same distance from the center of the tire-receiving roller 88; and therefore when the pins 84 are set in the openings 80 and 81, the tire-receiving roller 88 will have its axis parallel to the inclined lines connecting corresponding openings 80 and 81. This inclination is important since it helps to drive the faces of tires, resting on roller 88, against the flange 90, thereby assuring proper registration of those faces with the cutters of the tire grooving machine.

The numeral 92 denotes a plate of stiff metal, preferably steel, which has the upper and lower edges thereof folded to provide stiffening for that plate. That plate serves as a supporting wall for the upper ends of certain portions of the groove-forming mechanism of the tire grooving machine, as that machine is viewed in Fig. 3. Another plate 94 of stiff metal is mounted at the opposite side of the tire grooving machine, and that plate has a horizontal offset 96. The upper edge of the plate 94 is folded horizontally, and the inner end of the horizontal offset 96 is folded downwardly and then horizontally. The folds in the plate 94 and in the horizontal offset 96 stiffen that plate. The plate 94 serves as a wall that is generally comparable to the wall provided by the plate 92; and it serves to support the other ends of those certain portions of the groove forming mechanism of the tire grooving machine. The walls 92 and 94 are secured to the base plate 30 by nut and bolt combinations 98 which extend through aligned openings in the folded bottoms of those walls and in the troughs 32. The walls 92 and 94 will help stiffen the base plate 30, and the ribs 34 of that base plate will help stiffen walls 92 and 94. The overall result is that the base plate 30 and the walls 92 and 94 constitute a rigid and rugged frame for some of the grooving mechanism of the tire grooving machine.

The offset 96 in the plate or wall 94 causes a portion of the weight of the grooving mechanism of the tire grooving machine to overhang the lower edge of the base plate 30, as that plate is viewed in Fig. 3. It is this overhanging of the weight that makes advisable the provision of two springs 60 at the lower end of the central span 72 of caster bracket 70, as that caster bracket is viewed in Fig. 9.

The numeral 100 denotes elongated, generally prismatic bars that are mounted at the inner faces of the walls 92 and 94. The numeral 102 denotes a cylindrical rod that has the ends thereof abutting the confronting faces of the two bars 100. Bolts 106 extend through aligned openings in the walls 92 and 94, the bars 100 and the rod 102. The bolts pass freely through the aligned openings in the walls 92 and 94 and in the bars 100, but they seat in the openings in the rod 102. A cylindrical rod 104, comparable to the cylindrical rod 102, has the opposite ends thereof abutting the confronting faces of the bars 100. Bolts 106 extend through aligned openings in the walls 92 and 94 and in the bars 100 and seat in threaded openings in the ends of the rod 104. The rods 102 and 104 coact with the bars 100 to provide rigid reinforcements for the upper ends of the walls 92 and 94.

Figures 8, 9:
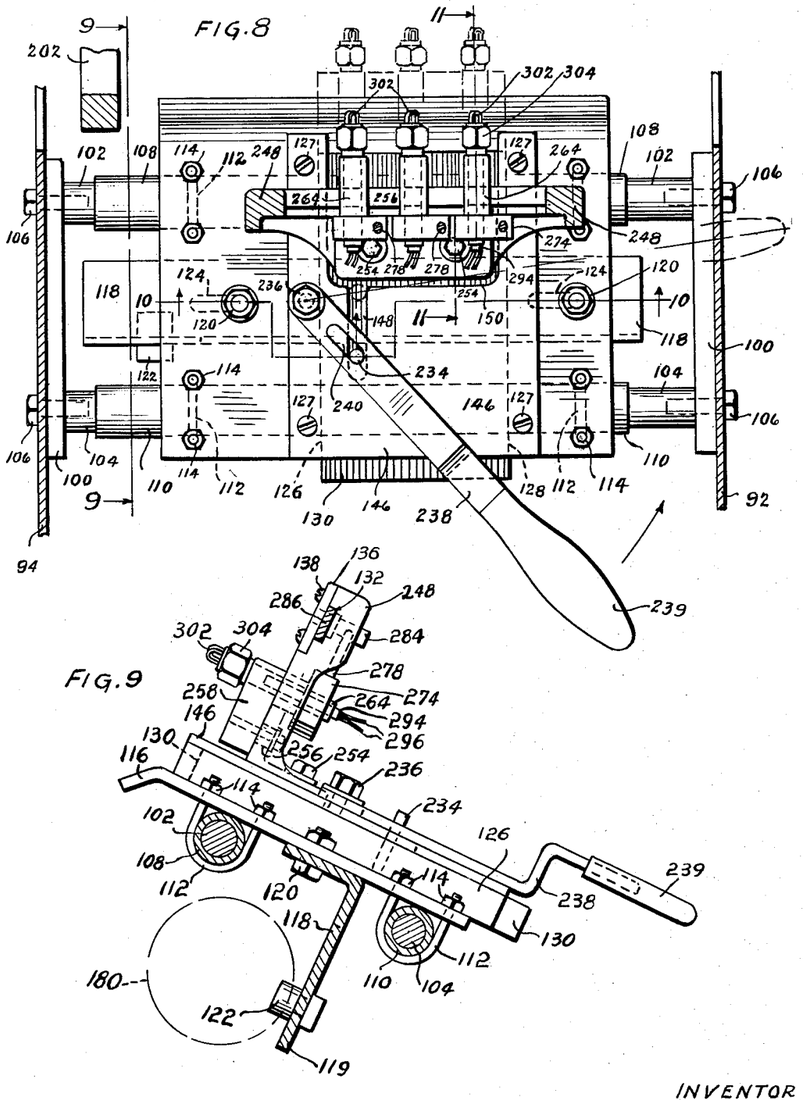
Fig. 8 is a sectional view of yet another portion of the tire grooving machine of Fig. 1, and it is taken along the plane indicated by the line 8—8 in Fig. 1.
Fig. 9 is a sectional view in elevation of the portion of the tire grooving machine shown in Fig. 8, and it is taken along the plane indicated by the line 9—9 in Fig. 8.
Figure 10:
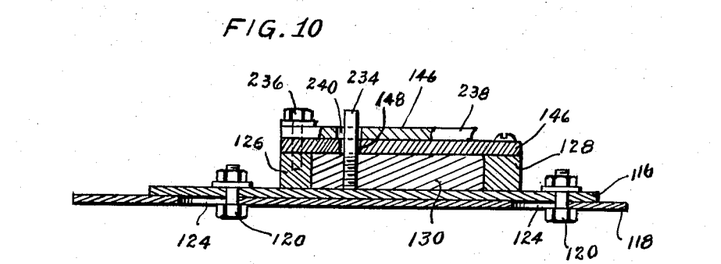
Fig. 10 is a sectional view of the portion of the tire grooving machine shown in Fig. 8, and it is taken along the broken plane indicated by the line 10—10 in Fig. 8.

Prior to the time the bolts 106 are seated in the ends of the rods 102 and 104, sleeves 108 and 110 are telescoped over the rods 102 and 104 respectively. These sleeves will fit the rods 102 and 104 rather closely but will be able to reciprocate relative to those rods. U-bolts 112 extend around the bottom surfaces of the sleeves 108 and 110 and extend upwardly through openings in a plate 116. Nuts 114 are threaded onto the upper ends of the U-bolts 112; and those nuts will maintain the plate 116 in assembled relation with the U-bolts 112 and with the sleeves 108 and 110. The nuts 114 will be threaded onto the U-bolts 112 with sufficient force to clamp the sleeves 108 and 110 to the plate 116 tightly enough to make certain that the sleeves 108 and 110 and the plate 116 will move as a unit. The left hand end of the plate 116, as that plate is viewed in Fig. 9, is bent downwardly at a slight angle. This bend is intended to provide more clearance between that plate and the tires being grooved, and also to provide stiffening for the plate 116.

The plate 116 is additionally stiffened by an angle 118 which is secured to that plate by nut and bolt combinations 120. The angle has its horizontal portion abutting the underside of the plate 116, and it has its vertical portion extending perpendicularly to that surface. The angle 118 is generally parallel to the left hand and right hand edges of the plate 116, as that plate is viewed in Fig. 9. The vertical portion of the angle 118 has a downwardly extending projection 119, and that projection carries a cam follower 122. The horizontal portion of the angle 118 has two longitudinally extending slots 124 therein, and those slots receive the nut and bolt combinations 120. Loosening of the nut and bolt combinations 120 will permit movement of the angle 118 transversely of the plate 116. Once the desired setting of the angle 118 relative to the plate 116 has been attained, the nut and bolt combinations 120 can be tightened to maintain that setting.

Elongated prismatic guide bars 126 and 128 are mounted on the upper face of the plate 116. Those guide bars are spaced apart and are held in position by fasteners 127, shown in the form of machine screws, which extend downwardly through those bars and seat in the plate 116. Those fasteners also extend through un-threaded openings in a retaining plate 146 that rests atop the guide bars 126 and 128. The guide bars 126 and 128 are bridged by the plate 146 and those guide bars are disposed on opposite sides of a plate 130. The guide bars 126 and 128 coact with the plates 116 and 146 to confine the plate 130 for reciprocal movement relative to the plate 116. A slot 148 is provided in the plate 146; and a cut-away area 150 is also provided in the plate 146. The cut-away area 150 starts at the upper end of that plate, as that plate is viewed in Fig. 8, and it extends almost half way down to the lower end of that plate. The cut-away area 150 is spaced inwardly from the confronting edges of the guide bars 126 and 128, and it defines a generally rectangular area. The slot 148 is contiguous with and extends downwardly from the cut-away area 150.

The cut-away area 150 of the plate 146 accommodates a bracket 248 which has two upwardly extending arms that form a wide U. That bracket has a central portion that abuts and rests upon the plate 130; and it has slots, not shown, through which bolts 254 extend and then seat in the plate 130. Those slots are comparable to and perform the function of the slots 252 in said application. In addition the bracket 248 has a pivot, not shown, like the pivot 250 in the said application; and that pivot confines the bracket 248 for rotation about a fixed center.

The bolts 254 can be loosened to permit limited rotation of the bracket 248 relative to the plate 130 about the said pivot. Such rotation is desirable because it makes it possible to set the bracket 248 so it is parallel to the face of the tire being grooved. Once the bracket has been set, the bolts 254 can be tightened to prevent undesired rotation of the bracket 248 relative to the plate 130.

The bracket 248 has a horizontally directed slot 256 in the closed end of the U formed by that bracket. This slot is elongated, and it is substantially as long as the plate 130 is wide. A number of pivot blocks 258 have square faced projections that are disposed within the slot 256; and those square faced projections resist rotation of those blocks relative to that slot. The pivot blocks 258 have threaded openings in those square faced projections, and those openings receive the threaded shanks of bolts 262. Washers 260 encircle the bolts 262, and those washers bear against the face of the bracket 248. The bolts 262 and the washers 260 can coact with the pivot blocks 258 to lock those pivot blocks in position on the bracket 248. However, the bolts 262 can be loosened to permit the pivot blocks 258 to be slid along the length of the slot 256; and those bolts can even be loosened to the point where they permit the full removal of the pivot blocks 258 from the slot 256. In the particular modification shown in the drawing, three such pivot blocks 258 are shown, but a greater or lesser number of those pivot blocks could be used.

Each of the pivot blocks 258 has an opening 263 therethrough. Each opening 263 receives a support 264 in the form of an elongated hollow rod, and that rod telescopes readily within the opening 263 in the pivot block 258. Moreover, the rod 264 can rotate readily relative to the pivot block 258. A radially extending shoulder 266 is provided on the support 264; and that shoulder extends outwardly beyond the outer diameter of the opening 263 in the pivot block 258. Hence, the shoulder 266 limits the extent to which the support 264 can extend into the opening 263. Threads, not shown, are provided at one end of the support 264; and those threads receive the threads on retaining ring 304. That ring has a frusto-conical surface that coacts with tapered edges on a slotted rectangular plate to releasably clamp a U-shaped cutter 302 in assembled relation with the support 264, all as explained in said application.

Figure 11:
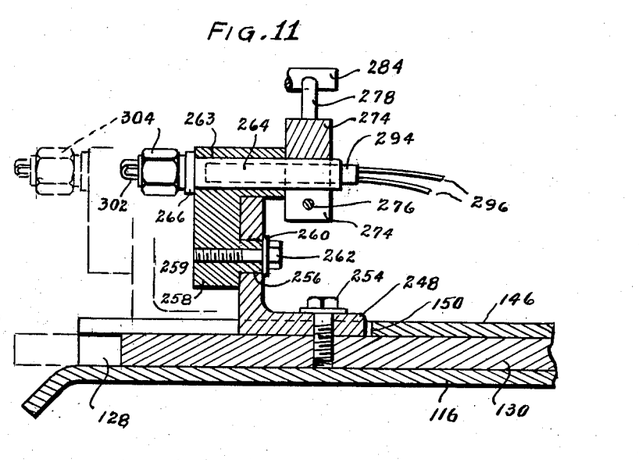
Fig. 11 is another sectional view of the portion of the tire grooving machine shown in Fig. 8, and it is taken along the broken plane indicated by the line 11—11 in Fig. 8.
Figure 13:
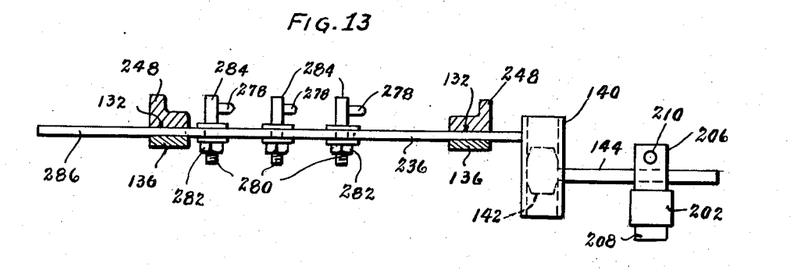
Fig. 13 is a sectional view in plan of a portion of the tire grooving machine shown in Fig. 7, and it is taken along the broken plane indicated by the line 13—13 in Fig. 7.
Figure 14:
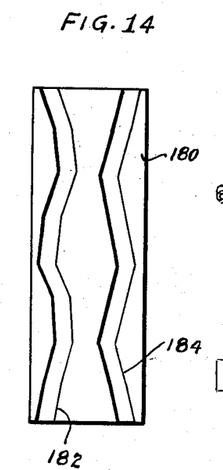
Fig. 14 is a view of the developed face of the cam used in the tire grooving machine of the present invention.

The other end of the support 264 extends outwardly from the opening 263 in the pivot block 258, and that projecting end of the support 264 is encircled by a slotted clamp 274; and that clamp is best shown in Fig. 11. That clamp will telescope snugly around the projecting end of the rod 264, and it has a screw 276 which can be tightened to lock that clamp onto the projecting end of the support 264. Hence, the clamp 274 and the support 264 can be made to rotate as a unit relative to the opening 263 in the pivot block 258.

The clamp 274 has a pin 278 extending upwardly from the upper end thereof. As indicated in said application, the pin 278 is preferably embedded in the upper end of that clamp. The upper end of the pin 278 extends through an opening in a pivot 284; and this pivot is rotatably mounted in a pivot block 280 which is held in a slot 288 of a connecting rod 286. The pivot block 280 has a threaded portion that can receive a nut 282. When the nut 282 is tightened on the threaded portion of the pivot block 280, all as brought out in said application, that nut will apply a binding force on the connecting rod 286 and thereby prevent relative movement between the pivot block and the connecting rod. However, when the nut 282 is loosened, the pivot block 280 can be slid along the length of slot 288 in the connecting rod 286.

Notches 132 are formed in the upwardly extending arms of the bracket 248, and those notches receive the connecting rod 286. Plates 136 span the notches 132 and overlie the connecting rod 286. Fasteners 138, shown in the form of machine screws, extend through openings in the plates 136 and seat in the upwardly directed arms of the bracket 248. The notches 132 are deep enough to permit ready reciprocation of the connecting rod 286 but are shallow enough to provide full guidance for that rod during its reciprocation.

One end of the connecting rod 286 carries a split sleeve 140, and that split sleeve accommodates a cylinder 142 which has tapered ends. That cylinder is carried by one end of a rod 144; and the other end of that rod extends into and is held by a slotted clamp 206. The slot in the clamp 206 defines two spaced portions which can be pulled together to clamp the rod 144, as by a set screw seated in opening 210 of that clamp. The clamp 206 has a portion which extends through an opening in a vertically directed lever 202 and which is encircled by a locking ring 208. This locking ring maintains the clamp 206 and the lever 202 in assembled relation.

The lower end of the lever 202 is secured to a pivot 200, and that pivot is mounted on a bracket 199. This bracket is secured to and supported by the wall 94. The lever 202 carries a cam follower 204 intermediate the upper and lower ends thereof. The cam follower 204 is between the pivot 200 and the upper end of the lever 202, and hence the lever 202 will provide a multiplying action of the movement of the cam follower. Specifically, any movement applied to the lever 202 by the cam follower 204 will be multiplied before it is transmitted to the upper end of the lever.

The clamp 206 will normally have a tight engagement with the rod 144. However, where desired, the clamp 206 can be loosened so the rod 144 can be moved transversely of that clamp. This facilitates the setting of the rod 286 relative to the lever 202, all as explained in said application.

The support 264 has an axially-extending recess therein that can receive a self-contained electrically-insulated resistance element 294. Preferably this resistance element will be of the cartridge type; and where this is the case it can readily be inserted in the recess and withdrawn from the recess as a unit. This element will fit the recess in the support 264 rather snugly, but it will be readily removable from that recess as desired. Leads 296 extend outwardly from the rear end of the cartridge resistance element 294, and those leads extend to a male plug that can be inserted in one of the two sockets shown on the connection box 167 at the right hand end of the base plate 30.

The numeral 152 denotes a sprocket wheel that is mounted on and carried by a rotatable shaft 176. That shaft has the opposite ends thereof supported by bearing blocks 172 and 174. The bearing brackets 172 and 174 are mounted on and carried by a generally trapezoidal support 171. The narrow dimension of that support is disposed above the central area 36 of the base plate 30, and it disposes the shaft 176 above that central area. Fasteners 169, shown in the form of screw and nut combinations, hold the support 171 in position on the base plate 30. The sprocket wheel 152 will be suitably secured to the shaft 176, as by a key or set screw. A second sprocket wheel 178 is mounted on the shaft 176; and that sprocket wheel will also be suitably secured to the shaft 176. A cam 180 is mounted on the end of the shaft 176 beyond the sprocket wheel 178. That cam has two grooves 182 and 184. The groove 182 accommodates the cam follower 204 on the lever 202, and the cam groove 184 accommodates the cam follower 122 on the projection 119 of the angle 118.

A pivot block 156 is mounted on the base plate 30 adjacent the wall 94, and a pivot block 158 is mounted on the base plate 30 adjacent the wall 92. Bolts 159 extend through openings in the bottoms of troughs 32 and seat in the pivot blocks 156 and 158; thereby securing those pivot blocks to the base plate 30. Those pivot blocks rotatably support a tire-receiving element 160 in the form of a cylindrical roller. The roller 160 has a generally frusto-conical flange 162 thereon. The axis of the tire-receiving roller 160 is parallel to the axis of the tire-receiving roller 88; and this means that the pivot block 158 is spaced a short distance to the right of the pivot block 156, as those pivot blocks are viewed in Fig. 3.

A continuous thread 164 is formed on the surface of the tire-receiving element 160; and that thread is inclined from lower left to upper right on the upper face of element 160, as that element is viewed in Fig. 3. Consequently, when the tire-receiving element 160 is rotated in the clockwise direction in Fig. 1, the thread 164 will provide a force on the face of the tire that will urge that face toward the flange 162. The thread 164 will also maintain a continuous engagement with the face of the tire while permitting dust, oil and water to fall down away from the face of that tire.

The frusto-conical flanges 90 and 162 of the tire-receiving elements 88 and 160 define a line that is generally parallel to the bottom edge of the base plate 30 in Fig. 3. The flanges 90 and 162 serve to limit movement of the faces of the tires toward the bottom edge of the base plate 30, in Fig. 3; and thus they serve to maintain those faces in fixed relation with the said line and with the cutters of the tire grooving machine.

A sprocket wheel 163 is mounted on and carried by the tire-receiving roller 160; and rotation of the sprocket wheel 163 will force rotation of the tire-receiving element 160. The sprocket wheel 163 is in register with the sprocket wheel 178 on the shaft 176, and a sprocket chain 155 extends around and meshes with the sprocket wheels 163 and 178.

A gear motor 166 of standard design and construction is mounted on the central area 36 of the base plate 30 by fasteners 165. Those fasteners are shown in the form of screw and nut combinations. The projecting shaft of the gear motor 166 carries a sprocket wheel 170, and that sprocket wheel is in register with the sprocket wheel 152 on the shaft 176. A sprocket chain 154 extends between and meshes with the sprocket wheels 152 and 170.

A pin 234 extends into, and is seated in, an opening in the plate 130; and that pin fits into the slot 148 of the plate 146. The pin 234 has a diameter which is smaller than the width of the slot 148, and hence that pin can reciprocate freely within the slot 148. That pin extends into and through an elongated slot 240 in an operating lever 238. One end of that lever is held for rotation by a pivot 236 which extends through the plate 146 and seats in the guide block 126. The other end of that lever is provided with a hand grip 239.

The gear motor 166 has leads, not shown, that extend to the connection box 167. Those leads are connected to the switch 168; and that switch can be set to drive the motor in forward direction, to drive the motor in the opposite direction or to cut the motor off completely. The switch 168 does not affect the flow of current to the heating units 294; and hence the starting and stopping of the motor 166 does not interfere with the heating of the cutters.

In preparation for the tire grooving operation, the plug for the heating units 294 is inserted in one of the sockets of connection box 167. Also one of the wheels of the automotive vehicle is raised up by a jack, and the tire on that wheel is rotated by hand. As the tire is rotated, it is inspected for the presence of embedded glass, nails, gravel and other hard particles. Those particles should be removed by a screw driver or other implement before the grooving step is begun because those particles could break the cutters 302.

Normally, the springs 60 hold the base plate 30 above, and out of engagement with, the ground, as indicated by solid lines in Fig. 2 and by dashed lines in Fig. 5. At such time, the tire grooving machine has its only contact with the ground through the medium of the casters 54. Those casters permit free and easy movement of the tire grooving machine along the ground, even if the ground is not perfectly smooth. In using the tire grooving machine, the tire-receiving element 88 and the pivot blocks 82 are lifted upwardly and separated from the base plate 30. During the upward lifting of the pivot blocks 82, the pins 84 thereon will be withdrawn from the openings 80 and 81 in the troughs 32. Thereupon, the base plate 30 can be slid into position under the jacked-up wheel of the vehicle; the casters 54 making such sliding movement easy and simple. That base plate, of course, carries the grooving mechanism with it; and that base plate will be moved far enough to place the flange 162 on the tire-receiving element 160 immediately adjacent one side of the tire on that wheel. Once this has been done, the pivot blocks 82 and the tire-receiving element 88 can be moved endwise into position on the base plate 30. As the pivot blocks 82 are moved into register with the troughs 32, the pins 84 on the bottoms of those pivot blocks will enter, and seat in, appropriate openings 80 and 81. For the convenience of the user, marks and designations can be placed on the upwardly extending ribs 34 of the base plate 30 to guide the positioning of the pivot blocks 82. Specifically, the ribs 34 can be provided with marks and designations to show where the pivot blocks 82 should be set for tires of different diameters.

Once the tire-receiving element 88 has been set in position, the jack can actuate to lower the wheel. As that wheel is lowered, it will engage both of the tire-receiving elements 88 and 160; and as it does so it will automatically center itself relative to those tire-receiving elements. This automatic centering action will result from the fact that the casters 54 keep the tire grooving machine freely movable until after the wheel has been lowered to the point where it applies appreciable forces to the tire-receiving elements 88 and 160. Consequently, when the tire first begins to engage those tire-receiving elements, the base plate 30 will be able to move in response to very light forces; and the arcuate configuration of the tire will coact with the arcuate configuration of the rollers 88 and 160 to apply sizable shifting forces to that base plate. Thus, if the tire and wheel are not precisely centered between the tire-receiving elements 88 and 160, but instead are a little closer to the tire-receiving element 88, the tire will cause the tire grooving machine to shift slightly to the left as the jack lowers the wheel and tire. Hence, by the time the full force of the wheel and tire is applied to the tire-receiving elements 88 and 160, the tire grooving machine will have precisely centered itself relative to that tire.

As the wheel is lowered downwardly by the jack, greater and greater forces are applied to the tire-receiving elements 88 and 160; and those elements will transmit those forces to the pivot blocks 82, 156 and 158 and thus to the base plate 30. Those forces quickly become sufficient to overcome the forces of the springs 60; and thereupon the base plate 30 moves down into engagement with the ground. The greater part of the base plate 30 will not directly engage the ground because the heads of the bolts 58, 98 and 159 will engage the ground and hold the base plate 30 a slight distance above the ground. This is desirable since it prevents any "rocking" of the base plate 30 relative to the ground. Further, it localizes the forces, that the tire grooving machine applies to the ground, to the heads of those bolts; and the resulting concentration of forces provides large pound per square inch pressures between those bolts and the ground. Such pressures are desirable because they positively prevent shifting of the tire grooving machine after the wheel has been lowered onto the rollers 88 and 160 by the jack.

At this time, one side of the tire will bear against the frusto-conical flanges 90 and 162 of rollers 88 and 160, the face of the tire will be indented by the turns of the thread 164 on roller 160, and the cutters 302 will be spaced a short distance away from the face of the tire. This initial spacing between the face of the tire and the cutters 302 is emphasized in Fig. 1. That spacing is helpful in keeping the tire from engaging and breaking the cutters 302 as the wheel is lowered by the jack.

While the cutters 302 are still spaced from the face of the tire, the bolts 254 will be loosened to permit the connecting rod 286 to be rotated into parallelism with the face of the tire. Once this has been done, the bolts 254 will be tightened. Thereupon the operator, who will be kneeling or squatting adjacent the tire grooving machine, will actuate the switch 168 to start the motor 166. That motor will rotate the tire-receiving roller 160 in the clockwise direction, as that roller is viewed in Fig. 1; and such rotation will rotate the tire in the counter clockwise direction in Fig. 1. Thereupon the operator rotates the lever 238 upwardly toward the bracket 248; and that rotation applies an upward and forward thrust to the pin 234. That thrust carries the pin 234 and the bracket 248 and its cutters 302 forward toward the position indicated by dotted lines in Fig. 8. That position is disposed forwardly enough to cause the cutters 302 to enter and start grooving the face of the tire 306. The heated cutters 302 will readily cut grooves in the face of the tire 306; and the operator can assure the formation of grooves of the desired depth by applying sufficient pressure to the grip 239 on lever 238 to hold the front faces of the threaded retainers 304 against the face of the tire. The pressure which the operator must apply to the grip 239 will not change appreciably during the grooving of any one tire, or even during the grooving of all the tires on an automotive vehicle; but the difference between the pressures that are required when the cutters 302 are new and when they are about to be replaced is very appreciable. All of the pressures required on the grip 239 are well within the capabilities of the operator; and he need only supply sufficient pressure to the grip 239 to hold the retaining elements 304 against the face of the tire.

The energization of the motor 166 will not only start the rotation of the tire 306 but it will also start rotation of the cam 180. Rotation of the cam 180 will force the cam followers 122 and 204 to follow the grooves 184 and 182 of that cam. Cam follower 122 will cause the angle 118 to move from side to side, and will therefore cause the bracket 248 to move from side to side. The cam follower 204 will act through the lever 202 and the rod 144 to move the connecting rod 236 from side to side. The resulting reciprocation of the bracket 248 will physically move the cutters from side to side across the face of the tire 306 while that tire is rotating in the counter clockwise direction. The instantaneous points of contact of the cutters 302 with the tire 306 will thus describe the lines indicated by the grooves 308 in Fig. 12. The resulting reciprocation of the connecting rod 286 will shift the cutters 302 from one inclined position to another; and that shifting will occur adjacent the ends of the path of reciprocation of the bracket 248, all as explained in the said application. This shifting is necessary because the rubber in the faces of tires is so stiff that the cutters 302 could be broken by the resistance of that rubber unless those cutters were set substantially parallel to the direction of cut.

The time required for the grooving operation is quite short. For example, a 10-20 truck tire can be grooved in two minutes. With smaller tires, the grooving operation will be faster; and with larger tires, the grooving operation will be somewhat slower. In any event, the operation is quite rapid.

At the conclusion of the grooving operation, the operator's pressure on the grip 239 is released; and the weight of bracket 248 and plate 130 will thereupon force the plate 130 to move away from the tire 306. This will free the cutters 302 from the tire. At such time, the switch 168 can be moved to off position and the wheel can be jacked up for movement of the tire grooving machine out from under the wheel.

In the event the operator wishes to stop the grooving operation and to inspect any part of the tire, he can shift the swich 168 to stop the motor. Further, if desired, the operator can shift the switch 168 to reverse the direction of rotation of the motor, all as explained in said application.

Whenever the tire grooving machine is used to groove tandem-mounted tires, the motor 166 is spaced away from the tire which is not being grooved. This means that only the tire-receiving element 88 and the pivot blocks 82 are disposed between the two tandem-mounted tires. The pivot blocks 82 and the flange 90 on the tire-receiving element 88 are made low enough and narrow enough that they can be placed between the tandem-mounted tires without difficulty. This dimensioning of pivot blocks 82 and of flange 90 facilitates the movement of the tire-receiving element 88 into position just before the wheel is lowered into position on the tire-receiving elements 88 and 160.

Casters are preferred because they greatly minimize the force required to move the tire grooving machine into position under the tire to be grooved. However, if desired, glides, skids or runners could be used in lieu of casters. The casters as well as the glides, skids or runners could be biased individually rather than mounted on caster brackets as shown. However, the caster brackets provide a simple and easy manner of resisting tilting of the ground-engaging elements. Such tilting would be hurtful since it could let the base plate 30 engage the ground even when the tire grooving machine was not engaged by a tire.

The tire-grooving machine is compact and is short in height. This is of the greatest importance since it makes it possible to groove tandem-mounted as well as individually mounted tires, and it makes it possible to move the tire-grooving machine under the fuel tanks of trucks and under the skirts of busses. In the preferred embodiment of the present invention, the distance from the lowermost portion of the base to the uppermost portion of the tire-grooving mechanism is no greater than the minimum spacing between the axes of rollers or circular cylinders 88 and 160. In terms of inches, that distance can be less than sixteen inches.

Whereas the drawing and accompanying description have shown and described a preferred embodiment of the present invention, it should be apparent to those skilled in the art that various changes may be made in the form of the invention without affecting the scope thereof.

What I claim is:

1. A tire-grooving machine that comprises an elongated sturdy frame, a power-driven tire-grooving mechanism mounted on and carried by said frame, ground-engaging elements adjacent each end of said frame, and springs that bias said ground-engaging elements downwardly relative to said frame, said power-driven tire-grooving mechanism including tire-receiving elements in the form of cylinders, rugged and unyielding pivot blocks for said tire-receiving elements that engage and are supported by said frame and that hold said tire-receiving elements a fixed distance above said frame, said tire-receiving elements extending transversely of said frame, each of said tire-receiving elements having a flange adjacent one end thereof to receive one side of a tire and thereby limit movement of said tire axially of said tire-receiving elements but having the other end thereof clear so it can permit movement of said tire axially of said tire-receiving elements and can thereby facilitate axial movement of said tire-receiving element into position beneath an elevated vehicle-carried tire, said flanges on both tire-receiving elements being adjacent one of the elongated sides of said frame, said ground-engaging elements having the form of elongated, transversely extending brackets that support casters adjacent the opposite ends thereof, each of said casters being readily rotatable about two angularly displaced axes to permit ready and easy translation of said frame along the ground in a direction parallel to the axes of said tire-receiving elements to permit said tire-grooving machine to be rolled laterally under an elevated vehicle-carried tire and also in a direction parallel to said one elongated side of said frame to permit centering of said tire-receiving elements relative to said tire, said springs biasing said casters of said ground-engaging elements for movement to positions below the lowermost portion of said frame, said springs normally enabling said casters of said ground-engaging elements to hold said lowermost portion of said frame out of engagement with the ground but responding to the lowering of said vehicle-carried tire onto said tire-receiving elements to yield and permit said lowermost portion of said frame to move downwardly and engage the ground, said tire-receiving elements being spaced apart but being substantially parallel, said tire-receiving elements engaging those portions of said vehicle-carried tire which are at opposite sides of the lowermost part of said vehicle-carried tire and responding to initial downward movement of said vehicle-carried tire to apply horizontally directed forces to said frame while said springs are enabling said casters of said ground-engaging elements to hold said lowermost portion of said frame out of engagement with the ground and thereby translate said frame along the ground until said tire-receiving elements are automatically centered relative to said vehicle-carried tire, said tire-receiving elements responding to further downward movement of said vehicle-carried tire to transmit forces to said springs that overcome said springs and force said lowermost portion of said frame solidly against the ground, said tire-receiving elements and pivot blocks and said frame being able to receive and support the weight of said vehicle-carried tire plus that part of the weight of said vehicle that is normally supported by said tire.

2. A tire-grooving machine that comprises an elongated sturdy frame, a power-driven tire-grooving mechanism mounted on and carried by said frame, ground-engaging elements adjacent each end of said frame, and springs that bias said ground-engaging elements downwardly relative to said frame, said power-driven tire-grooving mechanism including tire-receiving elements in the form of cylinders, pivots for said tire-receiving elements that engage and are supported by said frame and that hold said tire-receiving elements a fixed distance above said frame, said tire-receiving elements extending transversely of said frame, said springs biasing the lowermost portions of said ground-engaging elements for movement to positions below the lowermost portion of said frame and said springs normally holding said lowermost portion of said frame out of engagement with the ground but responding to the lowering of a vehicle-carried tire onto said tire-receiving elements to yield and permit said lowermost portion of said frame to move downwardly and engage the ground, said tire-receiving elements being spaced apart but being substantially parallel, said tire-receiving elements engaging those portions of said vehicle-engaging tire which are at opposite sides of the lowermost part of said vehicle-carried tire and responding to initial downward movement of said vehicle-carried tire to apply horizontally directed thrusts to said frame and thereby translate said frame along the ground until said tire-receiving elements are automatically centered relative to said vehicle-carried tire, said tire-receiving elements responding to further downward movement of said vehicle-carried tire to transmit forces to said springs that overcome said springs and force said lowermost portion of said frame solidly against the ground said tire-receiving elements and pivots and frame being able to receive and support the weight of said vehicle-carried tire plus that part of the weight of said vehicle that is normally supported by said tire.

3. A tire-grooving machine that comprises an elongated sturdy frame, a power-driven tire-grooving mechanism mounted on and carried by said frame, said power-driven tire-grooving mechanism including a tire-receiving element in the form of a cylinder, pivots for said tire-receiving element, a second tire-receiving element in the form of a cylinder, pivots for said second tire-receiving element, said pivots for said second tire-receiving element being carried by pivot blocks, said frame having a plurality of longitudinally alined vertically directed spaced apart openings therein adjacent one side of said frame and having a second plurality of longitudinally alined vertically directed spaced apart openings therein adjacent the opposite side of said frame, said pivot blocks having vertically depending pins that are selectively insertable into or separable from said openings in said frame, said pins being below the level of and adjacent the pivots carried by said pivot blocks, said pivot blocks having portions that extend laterally of said pins and longitudinally of said aligned openings to resist rotation of said pivot blocks about said pins, said pins coacting with the portions of said frame which define said openings to permit vertical movement of said pivot blocks relative to said frame but to prevent horizontal movement of said pivot blocks relative to said frame, said tire-receiving elements and pivot blocks and said frame being able to receive and support the weight of said vehicle-carried tire plus that part of the weight of said vehicle that is normally supported by said tire.

4. A tire-grooving machine that comprises an elongated sturdy frame, a power-driven tire-grooving mechanism mounted on and carried by said frame, said power-driven tire-grooving mechanism including a tire-receiving element in form of a cylinder, pivots for said tire-receiving element, a second tire-receiving element in the form of a cylinder, said second tire-receiving element having a flange adjacent one end thereof to receive one side of a tire but having the other end thereof clear so it can easily be moved axially of an elevated vehicle-carried tire, pivots for said second tire-receiving element, said pivots for said second tire-receiving element being carried by rugged and unyielding pivot blocks, said frame having a plurality of vertically directed spaced apart openings therein, said openings being adjacent the opposite sides of said frame, said pivot blocks having vertically depending pins that are selectively insertable into or separable from said openings in said frame, said pins being below the level of and adjacent the pivots carried by said pivot blocks, said pivot blocks having laterally extending portions that extend longitudinally of said frame to resist rotation of said pivot blocks about said pins, said pins coacting with the portions of said frame which define said openings to permit vertical movement of said pivot blocks relative to said frame but to prevent horizontal movement of said pivot blocks relative to said frame, said tire-receiving elements and pivot blocks and said frame being able to receive and support the weight of said vehicle-carried tire plus that part of the weight of said vehicle that is normally supported by said tire.

5. A tire-grooving machine that comprises an elongated sturdy frame, a power-driven tire-grooving mechanism mounted on and carried by said frame, ground-engaging elements adjacent each end of said frame, and springs that bias said ground-engaging elements downwardly relative to said frame, said power-driven tire-grooving mechanism including a tire-receiving element, pivots for said tire-receiving element that engage and are supported by said frame and that hold said tire-receiving element a fixed distance above said frame, a second tire-receiving element, and pivots for said second tire-receiving element that engage and are supported by said frame and that hold said second tire-receiving element a fixed distance above said frame, said ground-engaging elements having the form of elongated transversely extending brackets that support casters adjacent the opposite ends thereof, said casters being secured to said brackets by vertically-directed pivots whereby said casters are readily rotatable relative to said brackets, said casters having the ground-engaging portions thereof horizontally offset from said vertically-directed pivots whereby said casters render said brackets unstable and tend to cause said brackets to rotate relative to said frame, and said brackets having projections that extend laterally therefrom and that are connected to said frame, said projections limiting rotation of said brackets relative to said frame, said tire-receiving elements and pivots and frame being able to receive and support the weight of said vehicle-carried tire plus that part of the weight of said vehicle that is normally supported by said tire.

References Cited in the file of this patent

UNITED STATES PATENTS

| | | |
|---|---|---|
| 305,014 | Mueller | Sept. 9, 1884 |
| 1,041,234 | Blood | Oct. 15, 1912 |
| 1,407,015 | De Giers | Feb. 21, 1922 |
| 1,481,712 | Huckins | Jan. 22, 1924 |
| 1,659,829 | Mohler | Feb. 21, 1928 |
| 1,916,258 | Errig | July 4, 1933 |
| 2,149,010 | Errig | Feb. 28, 1939 |
| 2,392,667 | Hawkinson | Jan. 8, 1946 |
| 2,456,218 | Semisch | Dec. 14, 1948 |
| 2,651,893 | Braley | Sept. 15, 1953 |

FOREIGN PATENTS

| | | |
|---|---|---|
| 525,466 | Great Britain | Aug. 28, 1940 |
| 592,231 | Germany | Apr. 23, 1934 |